United States Patent Office 3,505,451
Patented Apr. 7, 1970

3,505,451
COMPOSITIONS AND METHODS FOR ALLEVIATING SCHIZOPHRENIA EMPLOYING ONE OF HALOPERIDOL, TRIFLUPERIDOL OR AN ACID ADDITION SALT THEREOF AND ONE OF DESIPRAMINE, IMIPRAMINE AND AN ACID ADDITION SALT THEREOF
Karl J. Brunings, Scarsdale, N.Y., assignor to Geigy Chemical Corporation, Ardsley, N.Y., a corporation of New York
No Drawing. Continuation-in-part of application Ser. No. 582,230, Sept. 27, 1966. This application Aug. 14, 1967, Ser. No. 660,197
Int. Cl. A61k 27/00
U.S. Cl. 424—244
10 Claims

ABSTRACT OF THE DISCLOSURE

A pharmaceutical composition for alleviation of mental disease without precipitating Parkinson-like symptoms comprising as active ingredients a tranquilizing and an antidepressant agent. An illustrative embodiment is a composition comprising haloperidol and desipramine.

CROSS-REFERENCE

This is a continuation-in-part application of copending application Ser. No. 582,230, filed Sept. 27, 1966, now abandoned.

DETAILED DISCLOSURE

This invention relates to compositions suitable for administration to patients suffering from metal disease, especially schizophrenia. More particularly, it is concerned with compositions comprising haloperidol, trifluperidol, 1 - [4' - (p - fluorophenyl) - 4' - oxo - 1' - butyl] - 4,4-tetramethylene dioxy piperidine, 1-[4'-(p-fluorophenyl)-4' - oxo - 1' - butyl] - 4,4 - (2' - phenyltrimethylenedioxy) piperidine or salts thereof and desipramine, imipramine or 5-(3-dimethylaminopropyl)-5H-dibenz[b,f]azepine and their salts, especially the fumarate of the last-mentioned compound.

It has been widely reported that haloperidol and trifluperidol are of remarkable use in the treatment of mental disease in humans. But it is also known that haloperidol and trifluperidol are of restricted effectiveness in treating certain patients and, in fact, they are contra-indicated in patients in severely depressed states and in patients with Parkinson's disease. Furthermore, haloperidol and trifluperidol have been implicated in the precipitation of side effects of a Parkinson-like nature which consist in rigidity, tremor, sucking and chewing movements, drooling, oculogyric crisis, and the like. Because of these side effects, the physician must use these valuable compounds with caution and, in some instances, this has required either discontinuance of the drugs or reduction of the amount which can be safely administered to a daily dosage level below which they are uniformly effective.

Accordingly, it is most desirable to provide a means to use haloperidol, trifluperidol or salts thereof at therapeutically effective levels with a minimum of accompanying side effects, especially Parkinson-like symptoms. Such an advantage now is provided by use of the composition and methods of the instant invention.

Also 1-[4'-(p-fluorophenyl)-4'-oxo-1'-butyl]-4,4-tetramethylene dioxy-piperidine, 1-[4'-(p-fluorophenyl)-4'-oxo - 1' - butyl] - 4,4 - (2' - phenyltrimethylenedioxy) piperidine or salts thereof have proved to be valuable tranquilizers. Therefore, it is desirable to combine the tranquilizing activity of 1-[4'-(p-fluorophenyl)-4'-oxo-1'-butyl]-4,4-tetramethylene dioxy-piperidine, 1-[4'-(p-fluorophenyl) - 4' - oxo - 1' - butyl] - 4,4 - (2' - phenyltrimethylenedioxy)piperidine or pharmaceutically acceptable salts thereof with the well-known antidepressants desipramine, imipramine or 5-(3-dimethylaminopropyl)-5H-dibenz [b,f]azepine in order to obtain a composition which is most suitable for treating mental diseases, especially schizophrenia.

According to the present invention, there is provided a pharmaceutical composition comprising (a) haloperidol, trifluperidol, 1-[4'-(p-fluorophenyl)-4'- oxo-1'-butyl]-4,4-tetramethylene dioxy-piperidine, 1-[4'-(p-fluorophenyl)-4' - oxo - 1' - butyl] - 4,4 - (2' - phenyltrimethylenedioxy) piperidine or a pharmaceutical salt thereof and (b) desipramine, imipramine or 5-(3-dimethylaminopropyl-5H-dibenz[b,f]azepine or a pharmaceutically-acceptable salt thereof. Also contemplated are the said compositions in dosage unit form including, (c) a pharmaceutically-acceptable carrier or diluent.

The desipramine or a salt thereof and imipramine or a salt thereof or 5-(3-dimethylaminopropyl)-5H-dibenz [b,f]azepine or a salt thereof are preferably present in the composition of the invention in a proportion in the range of from about 5 to 25 parts by weight of desipramine, imipramine or 5-(3-dimethylaminopropyl)-5H-dibenz[b,f]azepine per part by weight of the haloperidol, trifluperidol, 1-[4'-(p-fluorophenyl)-4'-ozo-1'-butyl]-4,4-tetramethylene dioxy-piperidine, 1-[4'-(p-fluorophenyl)-4' - oxo - 1' - butyl] - 4,4 - (2' - phenyltrimethylenedioxy) piperidine or salts thereof.

An important further embodiment of the instant invention is a method for alleviating schizophrenia without precipitating Parkinson-like symptoms which comprises administering to a host an effective amount of a pharmaceutical composition of the invention. An especially effective embodiment is in essence, a method for alleviating schizophrenia without precipitating Parkinson-like symptoms which comprises administering to a host an effective amount of a composition comprising (a) haloperidol, trifluperidol, 1-[4'-(p-fluorophenyl)-4'-oxo-1'-butyl]-4,4-tetramethylene dioxy-piperidine, 1-[4'-(p-fluorophenyl)-4' - oxo - 1' - butyl] - 4,4 - (2' - phenyltrimethylenedioxy) piperidine or salts thereof, and (b) from about 5 parts to about 25 parts of desipramine hydrochloride, imipramine or 5-(3-dimethylaminopropyl)-5H-dibenz[b,f]azepine per part by weight of one of said tranquilizers.

The compounds haloperidol, also know as 4-[4-p-chlorophenyl - 4 - hydroxypiperidino] - 4' - fluorobutyrophenone, and trifluperidol, also known as 4'-fluoro-4-[4-hydroxy - 4 - $\alpha,\alpha,\alpha$ - trifluoro - m - tolyl - piperidino]butyrophenone, both are drugs well known for their ability to assist in the clinical control of mental disease and they can readily be prepared by techniques familiar to those skilled in the art of preparing organic compounds. The compound desipramine and its salts are well known drugs indicated for long term control of depressive states. Desipramine, also known as 10,11-dihydro-5-(3-methylaminopropyl)-5H-dibenz[b,f]azepine, and imipramine, also known as 10,11-dihydro-5-(3-dimethylaminopropyl)-5H-dibenz[b,f]azepine are readily prepared by procedures familiar to those skilled in the art.

The term "host" when used herein and in the appended claims contemplates humans suffering with mental disease or psychiatric disorders. The term "schizophrenia" broadly contemplates both acute and chronic diseases or other pathological conditions of humans, characterized by loss of contact with environment and by disintegration of personality and which are commonly alleviated by treatment with psychotherapeutic agents, especially strong tranquilizers. Illustrative conditions alleviated through practice of the instant invention include; psychomotor agitation, mania, aggressiveness, assaultiveness, hostility, hallucinations, and delirium associated with acute and chronic psychoses, and the like. The term "pharmaceutically-acceptable acid addition salts" when used herein and in the appended claims in association with haloperidol and trifluperidol, contemplates those derived from the free base and organic and inorganic acids. Illustrative of the acids which form pharmaceutically acceptable addition salts with desipramine, imipramine and 5-(3 - dimethylaminopropyl)-5H-dibenz[b,f]azepine are, for example: hydrochloric, hydrobromic, sulfuric, phosphoric, methansulfonic, acetic, lactic, succinic, malic, aconitic, phthalic, tartaric, pamoic and the like, and especially the fumerate of 5-(3-dimethylamino-propyl)-5H-dibenz[b,f]azepine. Suitable acid addition salts of 1-[4'-(p - fluorophenyl)-4'-oxo-1'-butyl]-4,4-tetramethylene dioxy-piperidine and 1-[4'-(p-fluorophenyl)-4'-oxo-1' - butyl]-4,4-(2'-phenyltrimethylenedioxy)piperidine are those derived from hydrochloric acid, hydrobromic acid, sulphuric acid, phosphoric acid, methane sulphonic acid, ethane sulphonic acid, β-hydroxyethane sulphonic acid, acetic acid, malic acid, tartaric acid, citric acid, lactic acid, succinic acid, fumaric acid, maleic acid, benzoic acid, salicylic acid, phenylacetic acid, mandelic acid, embonic acid, and naphthalene-1,5-disulphonic acid.

The instant compositions are well tolerated by the patient. Their use is accompanied by a quick onset of action and a long lasting effect. This makes them useful against a broad spectrum of diseases, including, in addition to schizophrenia, manic phases of affective reactions; and psychotic reactions in patients with organic brain damage and mental deficiency.

The daily dosages for the compositions of the invention vary between about 3 and 240, and preferably 6 to 120 mg. for adult individuals. Of this daily dosage, the amount of desipramine, imipramine or 5-(3-dimethylaminopropyl)-5H-dibenz[b,f]azepine or their salts is 0.5 parts to 25 parts preferably of the order of from about 5 parts to about 25 parts by weight for each part by weight of haloperidol, trifluperidol, 1-[4'-(p-fluorophenyl)-4'-oxo-1'-butyl]-4,4-tetramethylene dioxy-piperidine, 1 - [4' - (p - fluorophenyl) - 4'-oxo-1'-butyl]-4,4-(2'-phenyltrimethylenedioxy)piperidine or salts thereof. Suitable dosage units such as tablets, press coated tablets or capsules contain from about 1.0 to about 5.0 and preferably about 2.0 mg. of haloperidol, trifluperidol, and about 5 to about 30, preferabyl about 15 mg. of 1-[4'-(p-fluorophenyl)-4'-oxo-1'-butyl]-4,4-tetramethylene dioxy-piperidine, 1-[4'-(p-fluorophenyl) - 4'-oxo-1'-butyl]-4,4-(2'-phenyltrimethylenedioxy)piperidine or salts thereof, and from about 5 to about 25 mg., and preferably about 15 mg. of desipramine, imipramine or 5-(3-dimethylaminopropyl)-5H-dibenz[b,f]azepine or their salts. An especially preferred unit dosage form for administration to humans is an oral tablet containing 2 mg of haloperidol or trifluperidol, or 15 mg. of 1-[4'-(p-fluorophenyl)-4'-oxo-1'-buylt]-4,4-tetramethylene dioxy-piperidine or 1-[4' - (p - fluorophenyl)-4'-oxo-1'butyl]-4,4-(2'-phenyltrimethylenedioxy)piperidine or salts thereof, and 15 mg. of desipramine hydrochloride, 5 - (3-dimethylaminopropyl)-5H-dibenz[b,f]azepine fumerate or imipramine hydrochloride. Administration of three to four tablets daily of this composition to adult human patients causes excellent response to manifestations associated with schizophrenia, with side effects noted in relatively few.

To produce dosage units for peroral application, the compositions of this invention may be combined, for example, with solid pharmaceutically acceptable pulverulent carriers such as lactose, saccharose, sorbitol, mannitol starches such as potato starch, corn starch or amylopectin, also laminaria powder or citrus pulp powder; cellulose derivatives or gelatin, also lubricants such as magnesium or calcium stearate or polyethylene glycols (carbowaxes) of suitable molecular weights may be added, to form tablets or press coated tablets. The latter are coated, for example, with concentrated sugar solutions which can contain, for example, gum arabic, talcum and/or titanium dioxide, or they are coated with a lacquer dissolved in easily volatile organic solvents or a mixture of organic solvents. Dyestuffs can be added to these coatings, for example, to distinguish between different contents of active substance.

Hard gelatin capsules contain, for example, granulates of the instant compositions with solid pulverulent carriers such as, for example, lactose, saccharose, sorbitol, mannitol, and further starches such as potato starch, corn starch or amylopectin, cellulose derivatives or gelatin, as well as magnesium stearate or stearic acid.

Such tablets and capsules contain preferably between about 6 and about 120 mg. of the instant compositions, said amounts constituting from 1 to 20 and preferably about 2 to about 10% of the total weight of the tablets and capsules respectively.

The following examples are given by way of illustrating the compositions and methods of the instant invention. They are not to be construed as limiting the scope in any way.

EXAMPLE 1

Manufacture of tablets 2.0 of haloperidol, 15.0 g. of desipramine hydrochloride, 24.0 g. of highly dispersed silicic acid and 643.1 g. of corn starch are well mixed and the mixture is uniformly moistened with a solution of 35.0 g. of gelatin, 20.0 g. of glycerin and 0.9 g. of sodium metabisulphite in 200 ml. of demineralized water. The resulting mass is granulated through a sieve and dried to a water content of 1.0–2.1% (absolute). The dry granulate is mixed with 60.0 g. of potato starch, 6.0 g. of highly dispersed silicic acid, 60.0 g. of talcum and 4.0 g. of magnesium stearate and the mixture is pressed into 1000 tablets each containing 2 mg. of haloperidol and 15 mg. of desipramine hydrochloride.

EXAMPLE 2

Manufacture of press coated tablets (a) For the preparation of the core 2.00 g. of haloperidol, 109.00 g. of dried corn or potato starch, 37.00 g. of lactose and 3.00 g. of highly dispersed silicic acid are well mixed and the mixture is uniformly moistened with a solution of 6.00 g. of gelatin and 4.00 g. of glycerin in approximately 55 ml. of dimineralized water. The mass obtained is granulated through a sieve and dried to a water content of 1.9–2.1% (absolute). The dry granulate is mixed with 10.00 g. of dried potato starch, 8.00 g. of talcum and 1.00 g. of magnesium stearate and the mixture is pressed into 1000 tablet cores each weighing 180 mg.

(b) A second granulate is prepared by uniformly moistening 15.00 g. of desipramine hydrochloride with a solution of 20.00 g. of gelatin and 15.00 g. of glycerin in approximately 200 ml. of demineralized water. This is followed by granulating and drying. This granulate is mixed with 512.00 g. of potato starch, 30.99 g. of talcum, 5.00 g. of highly dispersed silicic acid and 3.00 g. of magnesium stearate. The tablet cores produced according to (a) are caoted in special tablet machine with the mixture obtained. In this way 1000 press coated tablets each weighing 780 mg. and each containing 2 mg. of haloperidol and 15 mg. of desipramine hydrochloride are produced.

EXAMPLE 3

The procedures of Examples 1 and 2 are used, substituting appropriate quantities of ingredients, to prepare tablets containing (a) haloperidol and, respectively, (b) 5 and 25 parts of desipramine per part by weight of said haloperidol. These compositions are useful to alleviate schizophrenia without precipitating Parkinson-like symptoms.

EXAMPLE 4

Manufacture of capsules

| Ingredient: | Quantity (mg.) |
|---|---|
| Haloperidol | 2 |
| Desipramine hydrochloride | 15 |
| Corn starch, U.S.P. | 283 |

The above ingredients are mixed and introduced into a two-piece hard Gelatin No. 1 capsule. One such capsule is administered from two to four times daily to patients suffering with schizophrenia.

EXAMPLE 5

The procedures of Examples 1 and 2 are used, substituting appropriate quantities of ingredients, to prepare tablets containing (a) trifluperidol and, respectively, (b) 5 and 25 parts of desipramine per part by weight of said trifluperidol. These compositions are useful to alleviate schizophrenia without precipitaing Parkinson-like symptoms.

EXAMPLE 6

15 g. of 1-[4'-(p-fluorophenyl)-4'-oxo-1'-butyl]-4,4-tetramethylene dioxy-piperidine hydrochloride or salts thereof, 15.0 g. of desipramine hydrochloride, 24.0 g. of highly dispersed silicic acid and 643.1 g. of corn starch are well mixed and the mixture is uniformly moistened with a solution of 35.0 g. of gelatin, 20.0 g. of glycerin and 0.9 g. of sodium metabi-sulphite in 200 ml. of demineralized water. The resulting mass is granulated through a sieve and dried to a water content of 1.0–2.1% (absolute). The dry granulate is mixed with 60.0 g. of potato starch, 6.0 g. of highly dispersed silicic acid, 60.0 g. of talcum and 4.0 of magnesium stearate and the mixture is pressed into 1000 tablets each containing 15 mg. of 1-[4'-(p-fluorophenyl)-4'-oxo-1'-butyl] - 4,4 - tetramethylene dioxy-piperidine or salts thereof and 15 mg. of desipramine hydrochloride.

EXAMPLE 7

15 g. of 1-[4'-(p-fluorophenyl)-4'-oxo-1'-butyl]-4,4-tetramethylene dioxy-piperidine hydrochloride or salts thereof, 15.0 g. of imipramine hydrochloride 24.0 g. of highly dispersed silicic acid and 643.1 g. of corn starch are well mixed and the mixture is uniformly moistened with a solution of 35.0 g. of gelatin, 20.0 g. of glycerin and 0.9 g. of sodium metabi-sulphite in 200 ml. of demineralized water. The resulting mass is granulated through a sieve and dried ot a water content of 1.0–2.1% (absolute). The dry granulate is mixed with 60.0 g. of potato starch, 6.0 g. of highly dispersed silicic acid, 60.0 g. of talcum and 4.0 of magnesium stearate and the mixture is pressed into 1000 tablets each containing 15 mg. of 1-[4'-(p-fluorophenyl) - 4' - oxo-1'-butyl]-4,4-tetramethylene dioxy-piperidine hydrochloride or salts thereof and 15 mg. of imipramine (hydrochloride).

EXAMPLE 8

Manufacture of capsules

| Ingredient: | Quantity (mg.) |
|---|---|
| 1-[4'-(p-fluorophenyl)-4'-oxo - 1' - butyl]-4,4-tetramethylene dioxy-piperidine hydrochloride | 15 |
| Desipramine hydrochloride | 15 |
| Corn starch, U.S.P. | 270 |

The above ingredients are mixed and introduced into a two-piece hard gelatin No. 1 capsule. One such capsule is administered from two to four times daily to patients suffering from schizophrenia.

EXAMPLE 9

Manufacture of capsules

| Ingredient: | Quantity (mg.) |
|---|---|
| 1-[4'-(p-fluorophenyl)-4'-oxo - 1' - butyl]-4,4-tetramethylene - dioxy-piperidine hydrochloride | 15 |
| Imipramine hydrochloride | 15 |
| Corn starch, U.S.P. | 270 |

The above ingredients are mixed and introduced into a two-piece hard gelatin No. 1 capsule. One such capsule is administered from two to four times daily to patients suffering from schizophrenia.

EXAMPLE 10

Manufacture of capsules

| Ingredient: | Quantity (mg.) |
|---|---|
| 1-[4'-(p-fluorophenyl)-4'-oxo-1' - butyl] - 4,4-(2' - phenyltrimethylenedioxy)piperidine hydrochloride | 15 |
| Desipramine hydrochloride | 15 |
| Corn starch U.S.P. | 270 |

The above ingredients are mixed and introduced into a two-piece hard gelatin No. 1 capsule. One such capsule is administered from two to four times daily to patients suffering from schizophrenia.

EXAMPLE 11

Manufacture of capsules

| Ingredient: | Quantity (mg.) |
|---|---|
| 1-[4'-(p-fluorophenyl)-4'-oxo-1' - butyl] - 4,4-(2' - phenyltrimethylenedioxy)piperidine hydrochloride | 15 |
| 5-(3-dimethylaminopropyl) - 5H - dibenz[b,f]azepine fumerate | 15 |
| Corn starch U.S.P. | 270 |

The above ingredients are mixed and introduced into a two-piece hard gelatin No. 1 capsule. One such capsule is administered from two to four times daily to patients suffering from schizophrenia.

EXAMPLE 12

Manufacture of capsules

| Ingredient: | Quantity (mg.) |
|---|---|
| Haloperidol | 2 |
| 5-(3-dimethylaminopropyl) - 5H - dibenz[b,f]azepine fumerate | 15 |
| Corn starch U.S.P. | 283 |

The above ingredients are mixed and introduced into a two-piece hard gelatin No. 1 capsule. One such capsule is administered from two to four times daily to patients suffering from schizophrenia.

EXAMPLE 13

Manufacture of capsules

| Ingredient: | Quantity (mg.) |
|---|---|
| 1-[4'-(p-fluorophnyl)-4'-oxo - 1' - butyl] - 4,4-tetramethylenedioxy piperidine hydrochloride | 15 |
| 5-(3-dimethylaminopropyl) - 5H - dibenz[b,f]azpine fumerate | 15 |
| Corn starch U.S.P. | 270 |

The above ingredients are mixed and introduced into a two-piece hard gelatin No. 1 capsule. One such capsule is administered from two to four times daily to patients suffering from schizophrenia.

EXAMPLE 14

Manufacture of capsules

| Ingredient: | Quantity (mg.) |
|---|---|
| Trifluperidol | 2 |
| 5-(3-dimethylaminopropyl) - 5H - dibenz[b,f]azepine fumerate | 15 |
| Corn starch U.S.P. | 283 |

EXAMPLE 15

Manufacture of tablets 10.0 g. of 1-[4'-(p-fluorophenyl)-4'-oxo-1'-butyl]-4,4-(2' - phenyltrimethylenedioxy)piperidine hydrochloride, 15.0 g. of desipramine hydrochloride, 24.0 g. of highly dispersed silicic acid and 643.1 g. of corn starch are well mixed and the mixture is uniformly moistened with a solution of 35.0 g. of gelatin, 20.0 g. of glycerin and 0.9 g. of sodium metabi-sulphite in 200 ml. of demineralized water. The resulting mass is granulated through a sieve and dried to a water content of 1.0–2.1% (absolute). The dry granulate is mixed with 60.0 g. of potato starch, 6.0 g. of highly dispersed silicic acid, 60.0 g. of talcum and 4.0 g. of magnesium stearate and the mixture is pressed into 1000 tablets each containing 10 mg. of 1-[4'-(p-fluorophenyl)-4'-oxo-1'-butyl] - 4,4 - (2' - phenyltrimethylenedioxy)piperidine hydrochloride and 15 mg. of desipramine hydrochloride.

EXAMPLE 16

Manufacture of tablets 15.0 g. of 1-[4'-(p-fluorophenyl)-4'-oxo-1'-butyl]-4,4-(2' - phenyltrimethylenedioxy)piperidine hydrochloride, 15.0 g. of 5-(3-dimethylaminopropyl) - 5H - dibenz[b,f]asepine fumerate, 24.0 g. of highly dispersed silicic acid and 643.1 g. of corn starch are well mixed and the mixture is uniformly moistened with a solution of 35.0 g. of gelatin, 20.0 g. of glycerin and 0.9 g. of sodium metabi-sulphite in 200 ml. of demineralized water. The resulting mass is granulated through a sieve and dried to a water content of 1.0–2.1% (absolute). The dry granulate is mixed with 60.0 g. of potato starch, 6.0 g. of highly dispersed silicic acid, 60.0 g. of talcum and 4.0 g. of magnesium stearate and the mixture is pressed into into 1000 tablets each containing 15.0 mg. of 1-[4'-(p-fluorophenyl)-4'-oxo-1'-butyl]-4,4-(2' - phenyltrimethylenedioxy)piperidine hydrochloride, and 15.0 mg. of 5-(3 - dimethylaminopropyl) - 5H - dibenz[b,f]azepine fumerate.

Any changes in conditions such as quantities used obvious to those skilled in the art are considered within the scope of this invention.

What is claimed is:

1. A pharmaceutical composition for alleviating schizophrenia without precipitating Parkinson-like symptoms consisting essentially of (a) haloperidol, trifluperidol or a pharmaceutically acceptable acid addition salt thereof, (b) from about 5 to about 25 parts by weight of desipramine imipramine or a pharmaceutically acceptable acid addition salt thereof per part by weight of said haloperidol, trifluperidol or a pharmaceutically acceptable acid addition salt thereof and (c) a pharmaceutically acceptacle carrier for oral application.

2. A composition as defined in claim 1 containing haloperidol or a pharmaceutically acceptable acid addition salt thereof and desipramine or a pharmaceutically acceptable acid addition salt thereof.

3. A composition as defined in claim 1 containing haloperidol or a pharmaceutically acceptable acid addition salt thereof and imipramine or a pharmaceutically acceptable acid addition salt thereof.

4. A composition as defined in claim 1 containing trifluperidol or a pharmaceutically acceptable acid addition salt thereof and desipramine or a pharmaceutically acceptable acid addition salt thereof.

5. A composition as defined in claim 1 containing trifluperidol or a pharmaceutically acceptable acid addition salt thereof and imipramine or a pharmaceutically acceptable acid addition salt thereof.

6. A method for alleviating schizophrenia without precipitating Parkinson-like symptoms which comprises orally administering to a host a composition as defined in claim 1.

7. A method for alleviating schizophrenia without precipitating Parkinson-like symptoms which comprises orally administering to a host a composition as defined in claim 2.

8. A method for alleviating schizophrenia without precipitating Parkinson-like symptoms which comprises orally administering to a host a composition as defined in claim 3.

9. A method for alleviating schizophrenia without precipitating Parkinson-like symptoms which comprises orally administering to a host a composition as defined in claim 4.

10. A method for alleviating schizophrenia without precipitating Parkinson-like symptoms which comprises orally administering to a host a composition as defined in claim 5.

References Cited

Amer. J. of Psy. 117 (May 1961) p. 1030.
Amer. J. of Psy. 117 (December 1961) pp. 547–548.
Brit. J. Pharm., Spencer, 25 (442–455) 1965.

ALBERT T. MEYERS, Primary Examiner

S. J. FRIEDMAN, Assistant Examiner

U.S. Cl. X.R.

424—267